United States Patent Office 3,819,644
Patented June 25, 1974

3,819,644
BENZISOXAZOLO(THIONO)PHOSPHORIC
(PHOSPHONIC) ACID ESTERS
Walter Lorenz, Wuppertal-Cronenberg, Horst Boshagen, Haan-Rhineland, and Ingeborg Hammann and Wolfgang Behrenz, Cologne, Germany, assignors to Bayer Aktiengesellschaft, Leverkusen, Germany
No Drawing. Filed Sept. 1, 1971, Ser. No. 177,084
Claims priority, application Germany, Sept. 7, 1970,
P 20 44 194.5
Int. Cl. C07d 85/48
U.S. Cl. 260—307 D                        5 Claims

ABSTRACT OF THE DISCLOSURE

Benzisoxazolo(thiono)phosphoric(phosphonic) acid esters of the general formula:

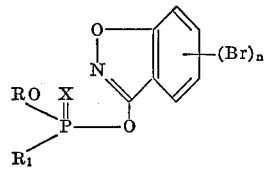

(I)

in which
X is oxygen or sulfur,
R is an alkyl radical with 1–6 carbon atoms,
$R_1$ is an alkyl or alkoxy radical with 1–6 carbon atoms, and
n is 1 or 2, which possess insecticidal, acaricidal, tickicidal, nematocidal and fungicidal properties.

The present invention relates to and has for its objects the provision of particular new benzisoxazolo(thiono)phosphoric(phosphonic) acid esters, i.e., O,O-dialkyl-O-(mono- or di-bromobenzisoxazol(3)yl)-phosphoric acid esters, their alkanephosphonic acid analogue and the thiono analogues of each; which possess insecticidal, acaricidal, tickicidal, nematocidal and fungicidal properties, active compositions in the form of mixtures of such compounds with solid and liquid dispersible carrier vehicles, and methods for producing such compounds and for using such compounds in a new way especially for combating pests, e.g., insects, acarids, ticks, nematodes and fungi, especially insects and acarids, with other and further objects becoming apparent from a study of the within specification and accompanying examples.

It is known from German Published Specification 1,253,713 that chlorine-substituted benzisoxazolo(thiono)phosphoric acid esters, such as O,O-dimethyl- (Compound A) or O,O-diethyl-O-(5-chlorobenzisoxazol(3)yl)-thionophosphoric acid ester (Compound B) or O,O-diethyl-O-(5-chlorobenzisoxazol(3)yl)phosphoric acid ester (Compound C), exhibit insecticidal properties.

The present invention provides, as new compounds, the benzisoxazolo(thiono)phosphoric(phosphonic) acid esters of the general formula:

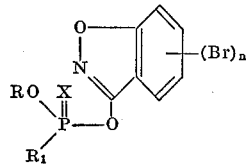

(I)

in which
X is oxygen or sulfur,
R is an alkyl radical with 1–6 carbon atoms,
$R_1$ is an alkyl or alkoxy radical with 1–6 carbon atoms, and
n is 1 or 2.

These new compounds have been found to exhibit strong insecticidal and acaricidal, as well as tickicidal, and in some cases nematocidal and fungicidal, properties.

The present invention also provides a process for the preparation of a compound of the formula (I), in which a 3-hydroxybenzisoxazole of the general formula:

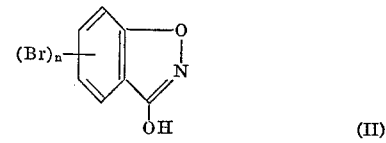

(II)

is reacted, in the presence of an acid-acceptor or in the form of a salt, with a (thiono)phosphoric(phosphonic) acid ester halide of the general formula:

(III)

in which formulae
X, R, $R_1$ and n have the meanings stated above, and
Hal denotes a halogen atom, preferably a chlorine atom.

Surprisingly, the benzisoxazolo(thiono)phosphoric (phosphonic) acid esters are distinguished by a considerably higher insecticidal and acaricidal activity than the known benzisoxazol(thiono)phosphoric acid esters of analogous constitution and the same direction of activity. The compounds according to the invention therefore represent a genuine enrichment of the art.

If, for example, 3-hydroxy-5-bromobenzisoxazole and O,O-diethylthionophosphoric acid ester chloride are used as starting materials, the reaction course can be represented by the following equation:

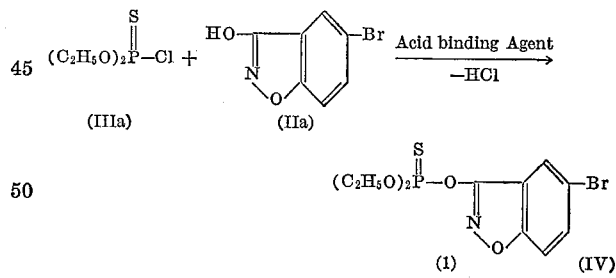

Preferably, in formula (III) and in formula (I), R denotes a straight-chain or branched lower alkyl radical of 1–4 carbon atoms, namely methyl, ethyl, n- or isopropyl or n-, iso-, sec.- or tert.-butyl, and $R_1$ denotes a straight-chain or branched alkyl or alkoxy radical with 1–4 carbon atoms, namely the alkyl radicals just named or the corresponding alkoxy radicals, viz. methoxy, ethoxy, n- or isopropoxy or n-, iso-, sec.- or tert.-butoxy.

As examples of the (thiono)phosphoric(phosphonic) acid halides and benzisoxazole derivatives which may be used as starting materials, there may be mentioned: O,O-dimethyl-, O,O-diethyl-, O,O-dipropyl-, O,O-di-isopropyl-, O-methyl-O-ethyl-, O-methyl-O-isopropyl-, O-ethyl-O-isopropyl-, O-methyl-O-butyl-, O,O-dibutyl-, O-sec.-butyl-O-ethyl- and O-tert-butyl-O-methyl-phosphoric acid ester chlorides and the corresponding thiono analogues; O-methyl-methane-, O-ethyl-propane-, O-isopropyl-ethane-, O-butyl-methane-, O-methyl-isopropane-, O-methyl-ethane, O-ethyl-ethane, O-propyl-methane- and O-butyl-ethane-phosonic acid ester chlorides and the corresponding thiono analogues; and 5-bromo-, 6-bromo-, 7-bromo- and 5,7-dibromo-3-hydroxybenzisoxazoles.

The (thiono)phosphoric(phosphonic) acid ester halides used as starting materials are known and can be prepared according to known processes; the same is true of the bromine-substituted hydroxybenzisoxazoles (see Chem. Ber. *100,* 954–960 (1967)).

The preparative process is preferably carried out with the use of suitable solvents or diluents. As such, practically all inert organic solvents are suitable, especially aliphatic and aromatic optionally chlorinated hydrocarbons, such as benzene, toluene, xylenes, benzine, methylene chloride, chloroform, carbon tetrachloride and chlorobenzene; ethers, such as diethyl ether, dibutyl ether and dioxane; ketones, for example acetone, and methylethyl, methylisopropyl and methylisobutyl ketones; and nitriles, such as acetonitrile or propionitrile.

As acid-acceptors, all customary acid-binding agents can be used. Particularly good results have been obtained with alkali metal carbonates and alcoholates, such as sodium and potassium carbonates, methylates and ethylates, as well as with aliphatic, aromatic or heterocyclic amines, for example, triethylamine, dimethylamine, dimethylaniline, dimethylbenzylamine and pyridine.

The reaction temperature can be varied within a fairly wide range. In general, the work is carried out at about 0° to 100° C., preferably at about 40 to 60° C.

The reaction is, in general, carried out at normal pressure.

When carrying out the preparative process, the starting materials are, in most cases, used in equimolar amounts; an excess of one or the other of the reactants brings no substantial advantages. The reaction is preferably effected in the presence of one of the above-mentioned solvents, as well as in the presence of an acid-acceptor, within the stated temperature range; after several hours' stirring—possibly with heating—the reaction mixture may be worked up in any usual manner. The use of an acid-acceptor may be dispensed with by using the heterocyclic reactant in the form of a salt, especially an alkali metal, alkaline earth metal or ammonium salt.

The substances according to the invention are obtained in most cases in the form of colorless to slightly yellow-colored, viscous, water-insoluble oils which cannot be distilled without decomposition but can, by so-called "slight distillation," that is by longer heating to moderately elevated temperatures under reduced pressure, be freed from the last volatile components and in this way be purified. For their characterization, the refractive index is especially suitable. The compounds that are obtained in crystalline form may be characterized by their melting points.

As already mentioned, the new bromine-substituted benzisoxazolo(thiono)phosphoric(phosphonic) acid esters are distinguished by an outstanding insecticidal and acaricidal effectiveness against crop pests, pests harmful to health and pests of stored products. They possess a good activity against both sucking and eating insects, and mites (*Acarina*). At the same time, they exhibit a low phytotoxicity. They also show tickicidal and, in some cases, also nematocidal, and fungicidal properties.

For these reasons, the compounds according to the invention may be used with success as pesticides in crop protection and the protection of stored products, as well as in the hygiene and veterinary fields.

To the sucking insects contemplated herein there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Crytomyzus korschelti*), the rosy apple aphid (*Sapphaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis,* and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscellis bilobatus* and *Nephotettix bipunctatus;* and the like.

In the case of the biting insects contemplated herein, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the caggabe moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galeria mellonella*); and the like.

Also to be classed with the biting insects contemplated herein, are beetles (*Coleoptera*), for example the granary weevil (*Sitophilus granarius=Calandra granaria*), the Colorado beetle (*Leptiontarsa decemlineata*), the dock beetle (*Gastrophysa viridula*), the mustard beetle (*Phaedon cochleariae*), the blossom beetle, (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the nothern corn billbug (*Calandra or Sitophitus zeamais*), the drgusore bettle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, *Orthoptera,* for example the house cricket (*Atcheta domesticus*); termites such as the eastern subterranean termite (*Reticulitermes flavipes*) and *Hymenopetera* such as ants, for example the garden ant (*Lasius niger*); and like.

The *Diptera* contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the nothern house mosquito (*Culex pipiens*) and the malaria mosquito (*Anopheles stephensi*); and the like.

With the mites (*Acarina*) contemplated herein there are classed, in particular, the spider mites (*Tetranychidae* such as the two-spotted spider mite (*Tetranychus telarius=Tetranychus althaeae* or *Tetranychus urticae*) and the European red mite (*Paratetranychus pilosus =Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against pests harmful to health and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures; such as freon; inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/ or with other known compatible active agents, especially plant protection agents, such as insecticides, acaricides, tickicides, nematocides and fungi, or bactericides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g., about 20–100% by weight of the active compound.

Furthermore, the present invention contemplates methods of selectively killing, combating or controlling pests, e.g., insects, acarids, ticks, nematodes and fungi, and more particularly methods of combating at least one of insects and acarids, which comprises applying to at least one of correspondingly (a) such insects, (b) such acarids, (c) such ticks, (d) such nematodes, (e) such fugi, and (f) the corresponding habitat thereof, i.e., the locus to be protected, a correspondingly combative or toxic amount, i.e., an insecticidally, acaricidally, tickicidally, nematocidally or fungicidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Phaedon larvae test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compounds, the times of evaluation and the results can be seen from the following Table 1:

TABLE 1.—PHAEDON LARVAE TEST

| Active compound | Concentration of active compound in percent | Degree of destruction in percent after 3 days |
|---|---|---|
| (A) ... structure with Cl, $(CH_3O)_2\overset{S}{\underset{\|}{P}}-O$ (Known) | 0.1<br>0.01<br>0.001 | 100<br>100<br>0 |
| (B) ... structure with Cl, $(C_2H_5O)_2\overset{S}{\underset{\|}{P}}-O$ (Known) | 0.1<br>0.01<br>0.001 | 100<br>100<br>0 |
| (C) ... structure with Cl, $(C_2H_5O)_2\overset{S}{\underset{\|}{P}}-O$ (Known) | 0.1<br>0.01<br>0.001 | 100<br>90<br>0 |
| (1) ... structure with Br, $(C_2H_5O)_2\overset{S}{\underset{\|}{P}}-O$ | 0.1<br>0.01<br>0.001 | 100<br>100<br>90 |

Example 2

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concenrations of the active compounds, the evaluation times and the results can be seen from Table 2:

TABLE 2.—PLUTELLA TEST

| Active compound | Concentration of active compound in percent | Degree of destruction in percent after 3 days |
|---|---|---|
| (C) ... structure with Cl, $(C_2H_5O)_2\overset{S}{\underset{\|}{P}}-O$ (Known) | 0.1<br>0.01<br>0.001<br>0.0001 | 100<br>100<br>50<br>0 |
| (1) ... structure with Br, $(C_2H_5O)_2\overset{S}{\underset{\|}{P}}-O$ | 0.1<br>0.01<br>0.001 | 100<br>100<br>100 |
| (2) ... structure with Br, $C_2H_5$, $C_2H_5O$, $\overset{S}{\underset{\|}{P}}-O$ | 0.1<br>0.01<br>0.001<br>0.0001 | 100<br>100<br>100<br>50 |

Example 3

Critical concentration test/soil insects

Test insect: *Tenebrio molitor* larvae in the soil
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The preparation of the acitve compound in the preparation is of practically no importance; only the amount of active compound per unit volume of soil, which is given in p.p.m. (for example mg./l.), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

The active compounds, the amounts applied and the results can be seen from the following Table 3:

TABLE 3.—SOIL INSECTICIDES
[*Tenebrio molitor* larvae in the soil]

| Active compound | Degree of destruction in percent with a concentration of active compound in p.p.m. of— | | | | |
|---|---|---|---|---|---|
| | 40 | 20 | 10 | 5 | 2.5 |
| (B) ... structure with Cl, $O-\overset{\|}{\underset{S}{P}}(OC_2H_5)_2$ (Known) | 0 | | | | |
| (1) ... structure with Br, $O-\overset{\|}{\underset{S}{P}}(OC_2H_5)_2$ | 100 | 100 | 100 | 50 | 0 |

EXAMPLE 4

Critical concentration test/soil insects

Test insect: *Phorbia brassicae* maggots in the soil
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

The active compounds, the amounts applied and the results can be seen from the following Table 4:

TABLE 4.—SOIL INSECTICIDES
[*Phorbia brassicae* maggots in the soil]

| Active compound | Degree of destruction in percent with a concentration of active compound in p.p.m. of— | | | | |
|---|---|---|---|---|---|
|  | 20 | 10 | 5 | 2.5 | 1.25 |
| (B) 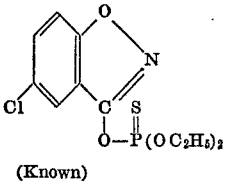 (Known) | 0 | | | | |
| (2) 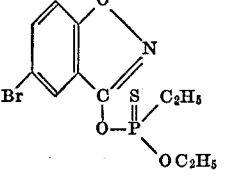 | 100 | 100 | 75 | 30 | 0 |

EXAMPLE 5

Phorodon test (contact action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Hop plants (*Humulus lupulus*) which have been heavily infested with the hop aphid (*Phorodon humuli*) are sprayed with the preparation of the active compound until dripping wet.

After the specified periods of time, the degree of destruction is determined as a percentage: 100% means that all the aphids were killed; 0% means that none of the aphids were killed.

The active compounds, the concentrations of the active compounds, the evaluation times and the results can be seen from the following Table 5:

TABLE 5
[*Phorodon humuli* test]

| Active compound | Concentration of active compound in percent | Degree of destruction in percent after 1 day |
|---|---|---|
| (C) 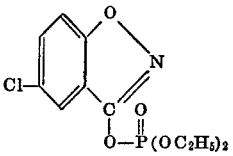 (Known) | 0.02<br>0.004<br>0.0008<br>0.00016<br>0.000032 | 100<br>95<br>95<br>90<br>65 |
| (2) 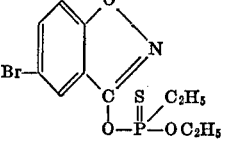 | 0.02<br>0.004<br>0.0008<br>0.00016<br>0.000032 | 100<br>100<br>100<br>98<br>98 |
| (1) 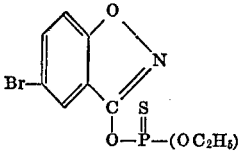 | 0.02<br>0.004<br>0.0008<br>0.00016<br>0.000032 | 100<br>100<br>100<br>100<br>100 |

EXAMPLE 6

Myzus resistant test (contact action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*/resistant) are sprayed with the preparation of the active compound until dripping wet.

After the specified periods of time the degree of destruction is determined as a percentage: 100% means that all the aphids are killed whereas 0% means that none of the aphids are killed.

The active compounds, the concentrations of the active compounds, the evaluation times and the results can be seen from the following Table 6:

TABLE 6
[*Myzus persicae*/resistant test]

| Active compound | Concentration of active compound in percent | Degree of destruction in percent after 1 day |
|---|---|---|
| (A) 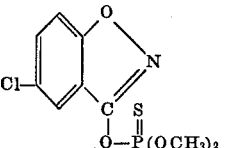 (Known) | 0.1 | 5 |
| (B) 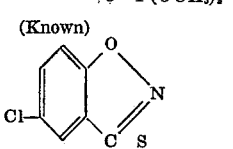 (Known) | 0.1<br>0.02<br>0.004<br>0.0008 | 95<br>82<br>40<br>5 |

TABLE 6—Continued

| Active compound | Concentration of active compound in percent | Degree of destruction in percent after 1 day |
|---|---|---|
| (C) Cl-[benzisoxazole]-O-P(=O)(OC$_2$H$_5$)$_2$ (Known) | 0.1<br>0.02<br>0.004<br>0.0008 | 100<br>100<br>25<br>10 |
| (2) Br-[benzisoxazole]-O-P(=S)(C$_2$H$_5$)(OC$_2$H$_5$) | 0.1<br>0.02<br>0.004<br>0.0008<br>0.00016 | 100<br>100<br>100<br>90<br>10 |

EXAMPLE 7

Mosquito larvae test

Test animals: *Aedes aegypti* larvae
Solvent: 99 parts by weight acetone
Emulsifier: 1 part by weight benzylhydroxydiphenylpolyglycol ether To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test animals and the results can be seen from the following Table 7:

TABLE 7.—MOSQUITO LARVAE TEST

| Active compound | Concentration of active compound of the solution in p.p.m. | Degree of destruction in percent |
|---|---|---|
| (B) Cl-[benzisoxazole]-O-P(=S)(OC$_2$H$_5$)$_2$ (Known) | 0.1<br>0.01 | 100<br>0 |
| (A) Cl-[benzisoxazole]-O-P(=S)(OCH$_3$)$_2$ (Known) | 1<br>0.1 | 100<br>90 |
| (C) Cl-[benzisoxazole]-O-P(=O)(OC$_2$H$_5$)$_2$ (Known) | 1<br>0.1 | 100<br>50 |

TABLE 7—Continued

| Active compound | Concentration of active compound of the solution in p.p.m. | Degree of destruction in percent |
|---|---|---|
| (1) Br-[benzisoxazole]-O-P(=S)(OC$_2$H$_5$)$_2$ | 0.01<br>0.001 | 100<br>0 |
| (2) Br-[benzisoxazole]-O-P(=S)(C$_2$H$_5$)(OC$_2$H$_5$) | 0.1<br>0.01 | 100<br>90 |

EXAMPLE 8

Test with parasitizing fly larvae

Solvent: 35 parts by weight ethyleneglycolmonomethyl ether
Emulsifier: 35 parts by weight nonylphenolpolyglycol ether To produce a suitable preparation of active compound, 30 parts by weight of the active substance concerned is mixed with the stated amount of solvent containing the proportion stated above of emulsifier, and the concentrate so obtained is diluted with water to the desired concentration.

About 20 fly larvae (*Lucilia cuprina*) are put into a test-tube which contains about 1 cc. of horse musculature. 0.5 ml. of the preparation of active compound is applied to this horseflesh. After 24 hours, the degree of destruction is determined as a percentage. 100% means that all, and 0% that none, of the larvae have been killed.

The active compounds tested, the concentrations applied and the test results obtained can be seen from the following Table 8:

TABLE 8
[*Lucilia cuprina* test]

| Active compound | Concentration of active compound in p.p.m. | Degree of destruction in percent |
|---|---|---|
| (1) Br-[benzisoxazole]-O-P-(OC$_2$H$_5$)$_2$ | 300<br>100<br>30<br>10<br>3<br>1 | 100<br>100<br>100<br>100<br>>50<br>0 |
| (2) Br-[benzisoxazole]-O-P(=S)(C$_2$H$_5$)(OC$_2$H$_5$) | 300<br>100<br>30<br>10 | 100<br>100<br>100<br>0 |

EXAMPLE 9

LD$_{100}$ test

Test animals: *Sitophilus granarius*
Solvent: acetone 2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The destruction is determined as a percentage.

The active compounds, the concentrations of the active compounds, and the effects on the test insects can be seen from the following Table 9:

TABLE 9.—LD₁₀₀ TEST

| Active compound | Concentration of active compound of the solution in percent | Degree of destruction in percent |
|---|---|---|
| (A) 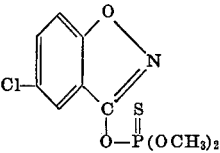 (Known) | 0.02<br>0.002 | 100<br>0 |
| (C) 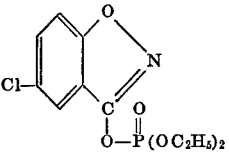 (Known) | 0.02<br>0.002 | 100<br>0 |
| (1) 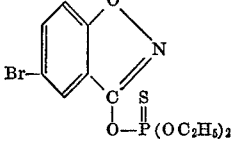 | 0.02<br>0.002 | 100<br>80 |
| (3) 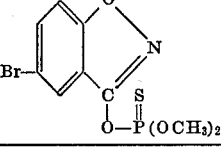 | 0.02<br>0.002 | 100<br>80 |

The process of the present invention is illustrated in and by the following preparative Example.

EXAMPLE 10

(a) Pursuant to Chem. Ber. Vol. 100, 954–960 (1967), the 3-hydroxy-5-bromo-benzisoxazole, required as starting product, can be prepared as follows:

1.0 mole of the appropriate salicylhydroxamic acid viz. 5-bromo-salicylhydroxamic acid, is suspended in 400 cc. of absolute tetrahydrofurane; 262 g. (2.2 moles) of thionyl chloride are slowly added dropwise between 25 and 35° C., with vigorous stirring, and stirring is afterwards continued for 15 to 30 minutes at 35° C. until all is dissolved. Subsequently, concentration is largely effected in a vacuum rotary evaporator at a bath temperature of 35° C., the syrup obtained is taken up in 400 cc. of absolute dioxane, and 303 g. (3 moles) of triethylamine are slowly added dropwise, with vigorous stirring and external cooling. After about one third of the triethylamine has been added droywise, the reaction solution thickens and the internal temperature suddenly rises. It must not exceed 30° C. During further dropwise addition, the contents of the flask again liquefy. Finally, introduction into 3 liters of water is effected, any oily impurities are separated, and the clear solution is then acidified with concentrated hydrochloric acid. After recrystallization, the desired product is obtained in good yield, exhibiting a sublimation point of 217° C.

(b)

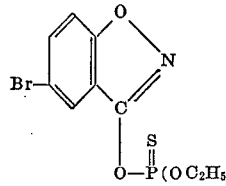

(1)

55 g. (0.256 mole) of the 5-bromo-3-hydroxybenzisoxazole of (a) are dissolved in 590 ml. of acetonitrile and, after addition of 35 g. (0.28 mole) of finely powdered potassium carbonate, the mixture is stirred for 30 minutes at 40° to 50° C. At 40° C., 45.5 g. (0.24 mole) of O,O-diethylthionophosphoric acid ester chloride are added dropwise. After three hours' stirring at 50° to 60° C., cooling is effected and the reaction mixture is poured into water. The oil which precipitates is taken up in benzene. The organic phase is washed neutral once again with a 2 N solution of sodium hydroxide and finally with water. After drying over sodium sulfate, the solvent is distilled off. As the residue, there are obtained 74 g. of O,O-diethyl-O-(5-bromobenzisoxazol(3)yl)-thionophosphoric acid ester as a clear yellow oil. Yield: 84% of theory; $n_D^{22}$: 1.5535.

$C_{11}H_{13}BrNO_4PS$ (molecular weight 366.1). Calculated: Br, 21.84%; N, 3.83%; A, 8.76%. Found: Br, 21.57%; N, 4.03%; A, 8.65%.

In an analogous manner, the following compounds are prepared:

| Constitution | Refractive index | Yield in percent of theory |
|---|---|---|
| (3) 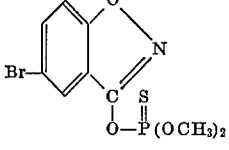 | $n_D^{22}$:1.5764 | 75 |

| | Melting point | |
|---|---|---|
| (2) 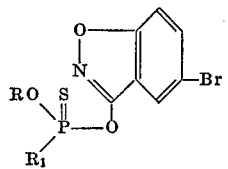 | 53° C. | 83 |

It will be appreciated that the instant specification and examples are set forth by way of illustration and not limitation and that various modifications and changes may be made without departing from the spirit and scope of the present invention.

What we claim is:

1. A benzisoxazolo (thiono) phosphoric (phosponic) acid ester of the formula

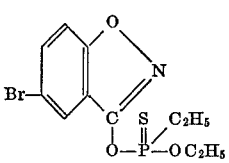

(I)

in which

R is alkyl of 1–6 carbon atoms, and
R₁ is alkyl or alkoxy of 1–6 carbon atoms.

2. A compound according to claim 1 in which R is methyl and R₁ is ethyl, methoxy or methyl or ethyl.

3. A compound according to claim 1 wherein such compound is O,O-diethyl-O-(5-bromobenzisoxazol(3)yl)-thionophosphoric acid ester of the formula

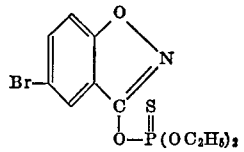  (1)

4. A compound according to claim 1 wherein such compound is O-ethyl-O-(5 - bromobenzisoxazol(3)yl)-ethanethionophosphoric acid ester of the formula

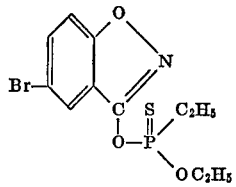  (2)

5. A compound according to claim 1 wherein such compound is O,O-dimethyl-O-(5-bromobenzisoxazol(3)yl)-thionophosphoric acid ester of the formula

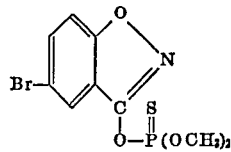  (3)

References Cited
FOREIGN PATENTS
965,997   8/1964   England.

DONALD G. DAUS, Primary Examiner
R. V. RUSH, Assistant Examiner

U.S. Cl. X.R.
424—200

UNITED STATES PATENT OFFICE
CERTIFICATE OF CORRECTION

Patent No. 3,819,644                          Dated  June 25, 1974

Inventor(s)   WALTER LORENZ ET AL

It is certified that error appears in the above-identified patent and that said Letters Patent are hereby corrected as shown below:

Col. 4, line 22, correct spelling of "cabbage".

Col. 4, line 42, correct spelling of "drugstore".

Col. 4, line 54, correct spelling of "Acheta".

Col. 6, line 38, correct spelling of "fungi".

Col. 7, Tables 1 and 2, Compound (C), correct formula to read as follows:

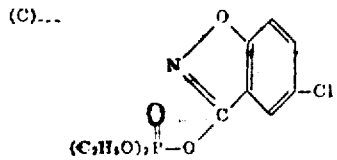

Col. 11, Table 6, Compound (C), correct formula to read as follows:

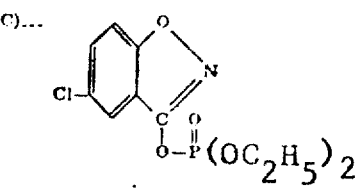

Col. 13, line 72, correct spelling of "dropwise".

Signed and sealed this 8th day of October 1974.

(SEAL)
Attest:

McCOY M. GIBSON JR.                      C. MARSHALL DANN
Attesting Officer                        Commissioner of Patents